2,740,212

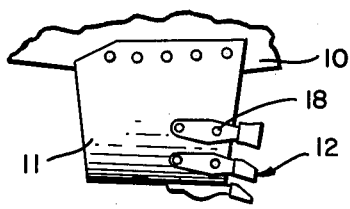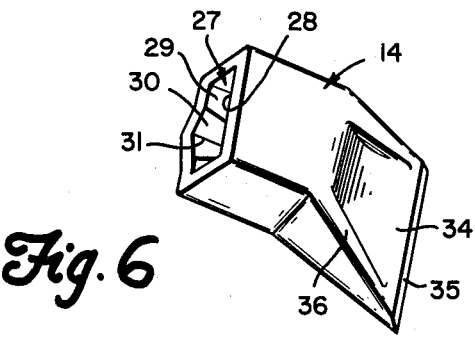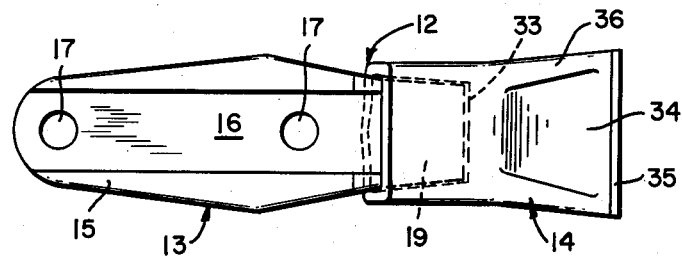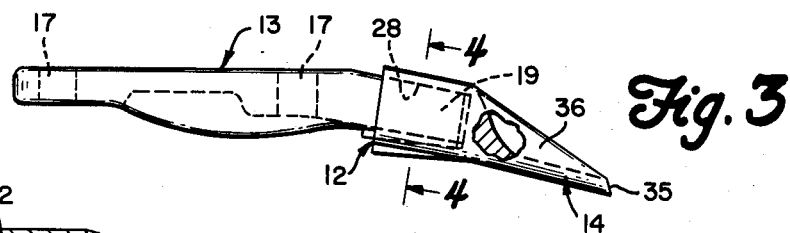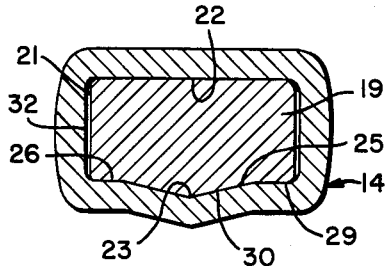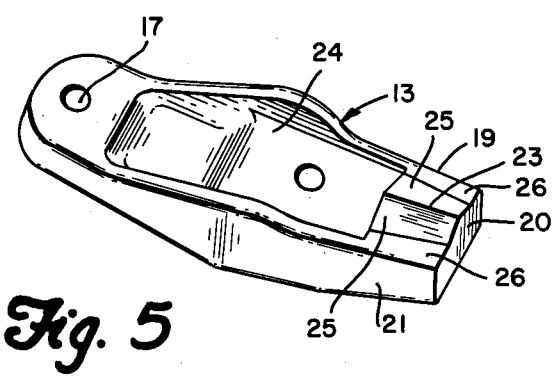
INVENTORS.
DWIGHT E. WERKHEISER
ERWIN L. BRAUTIGAM
ATTORNEY

United States Patent Office 2,740,212
Patented Apr. 3, 1956

ROOTER TOOTH ASSEMBLY

Dwight E. Werkheiser and Erwin L. Brautigam, Findlay, Ohio

Application September 30, 1955, Serial No. 537,708

2 Claims. (Cl. 37—142)

This invention relates to rooter tooth assemblies, but more particularly to such assemblies in which the tooth is detachable so as to be replaced when worn or damaged and which are used with earth-working machines, such as shovels, ditchers, and the like.

The company assignee of copending application, Serial Number 465,995, filed by N. Bennett on November 1, 1954, which is directed to a similar type of root tooth assembly, is wholly owned by the applicants.

An object is to produce a rooter tooth assembly having a new and improved detachable connection between the tooth and supporting shank elements, which not only provides an exceedingly rigid wedging connection effectively resisting forces tending to misalign the respective parts, but also makes possible a structure which can be economically forged so that the assembly can be produced inexpensively and repairs, such as reshaping after being subjected to service conditions, can be achieved in a simple and practical manner.

Other objects and advantages of the invention reside in details of construction, arrangement and assembly as will be hereinafter described, and, for purposes of illustration but not of limitation, an embodiment of the invention is shown on the accompanying drawings, in which Figure 1 is a fragmentary view of a portion of a digging wheel with an excavating bucket thereon equipped with rooter tooth assemblies;

Figure 2 is a plan view of the rooter tooth assembly showing the base and tooth parts in position of use;

Figure 3 is a side elevation of the rooter tooth assembly, a portion being broken away for purpose of clarity;

Figure 4 is an enlarged transverse sectional view on the line 4—4 of Figure 3;

Figure 5 is a bottom perspective view of the shank portion or base part of the assembly; and Figure 6 is a perspective view of the detachable tooth part.

The illustrated embodiment of the invention comprises a ditching wheel rim 10 to which a digging bucket 11 is attached, the same being provided with a series of rooter tooth assemblies 12. One form of ditching wheel of this character is shown in the patent to Hollmann, No. 2,305,-425, dated December 15, 1942 and since digging wheels of this type are well known to those skilled in the art, further description thereof is not considered necessary.

The rooter tooth assembly 12 consists essentially of two elements, a supporting shank member or base part 13 to which is wedgingly connected a detachable tooth part 14.

The shank element 13 comprises an elongate base 15 which on one side has a centrally disposed flat elongate panel 16 which abuts flatly against the outer face of the digging bucket 11 and, as shown, the panel is provided with a pair of longitudinally spaced holes 17 through which extends the rivets 18 for securing the shank element to the digging bucket, as indicated on Figure 1.

At the forward end of the base portion 15 is an integral shank portion 19 which inclines forwardly and downwardly and terminates in a blunt or flat nose 20. The opposite sides 21 have a gentle inward taper toward the nose 20. The inner or top surface 22 of the shank as viewed in Figure 3, is flat and tapers slightly downwardly and forwardly. At the bottom or that side opposite the flat surface 22 of the shank portion, as shown particularly on Figure 5, is a raised downwardly and forwardly inclined longitudinal ridge 23 which extends from a recessed portion 24 to the blunt nose 20. On opposite sides of the ridge 23 are flat downwardly and outwardly inclined surfaces 25 of equal area which are wider at the rear and narrower at the front, thus of wedge-shape form. The angle of the surfaces 25 is a gentle one rather than an abrupt one and these surfaces similarly incline downwardly and forwardly toward the nose 20. The lower edge of each of the surfaces 25 as viewed in Figure 5 is contiguous to a flat transverse surface 26, which tapers slightly downwardly and forwardly to the nose 20, thereby forming with the side 22 a wedge.

The detachable or replaceable tooth part 14 has a socket 27 at its inner end to receive the shank portion 19 of the member 13. The socket 14 is shaped to fit the shank portion and as viewed in Figure 6, it has a flat top wall 28 which inclines slightly forwardly and downwardly toward the cutting edge of the tooth. The bottom wall is formed with flat lateral surfaces 29 which engage the shank surfaces 26 respectively and which taper slightly upwardly toward the cutting edge. At the inner side of each surface 29 is an elongate downwardly and inwardly inclined flat surface 30 conforming to and engageable with the respective shank surface 25. The meeting sides of the surfaces 30 form a groove 31 to receive the ridge 23 of the shank. The area and longitudinal inclination of the surfaces 30 and groove 31 are the same as the corresponding surfaces of the shank and in the same direction, thereby to secure a binding fit when the tooth 14 is applied to the shank. The dimensions of the parts are such that the sides 21 of the shank throughout their length are slightly free from contact or engagement with the side walls 32 of the tooth socket 27 so that the wedging effect is achieved by the engagement of surfaces 25 and 30, and 26 and 29, and 22 and 28. The socket terminates in an integral up and down wall 33 which is flat and from which the blunt nose 20 of the shank is slightly spaced when the parts are assembled.

Forming an integral continuation of the bottom wall of the socket 27 is the bottom wall or panel 34 which terminates in the working edge 35 of the tooth. Also integral with the socket portion and flaring slightly outwardly are integral ribs 36 which incline downwardly from the socket portion to the working edge. The above assembly has been designed so that the respective parts can be forged from suitable steel alloys to provide the necessary strength and toughness and so that a minimum amount of machining or finishing is necessary, thereby to maintain the cost of production as low as possible without in any way sacrificing the desired wedging connection which rigidly holds the parts together but still is such that by striking the rear edge of the socket portion a few blows with a hammer or the like, disengagement can be readily effected when it is desired to replace a tooth.

The above described structure satisfies a desideratum for a replaceable tooth assembly in which the tooth is retained in place on its shank regardless of the character or force of the blow exerted on its working end. Difficulties have heretofore been experienced in having the tooth fall from its shank after a relatively short period of use because the wedging action between the parts has not been adequate. In the above described assembly, the area of the wedging surfaces has been increased and the design is such that the tendency of the tooth to shift laterally has been reduced if not eliminated. Thus the greater blows imparted to the tooth actually wedges it tighter on the shank and lateral stresses or shocks are adequately resisted. It will be manifest that there are several pairs of wedging surfaces in the above assembly which cooperate to increase the holding action and to prevent lateral movement of the tooth with respect to the shank part.

It is to be understood that numerous changes in details of construction, and arrangement, such for example as reversal of parts, may be effected without departing from the spirit of the invention, especially as defined in the appended claims.

What we claim is:

1. A rooter tooth assembly for excavators comprising a base part and a tooth part, one part having a forwardly projecting shank provided with forwardly and inwardly inclined side walls and top and bottom walls, one of said top and bottom walls being flat, a pair of laterally inclined tapered flat surfaces of equal area on the wall opposite to said flat wall, said last surfaces being wider at the rear and narrower at the front and extending outwardly from a ridge-like intersection of such surfaces, said tapered surfaces tapering longitudinally toward the forward end of said shank, and lateral flat surfaces extending from the outer edges of said tapered surfaces to said side walls, and the other part having a socket substantially conforming to the shape of said shank for effecting a wedging engagement of the parts.

2. A rooter tooth assembly for excavators comprising a base and a tooth, said base having a forwardly projecting shank with flat side walls inclining inwardly and forwardly, and top and bottom walls, said top wall being flat and inclining forwardly and downwardly towards the bottom wall, said bottom wall having a pair of laterally inclined tapered flat surfaces of equal area disposed centrally thereof, said tapered flat surfaces being wider at the rear and narrower at the front and extending upwardly from a ridge-like intersection thereof disposed centrally of the bottom wall, said tapered flat surfaces tapering longitudinally towards the forward end of said base, and lateral flat surfaces extending outwardly from the outer edges of said flat tapered surfaces to the side walls of said base, said lateral flat surfaces inclining forwardly slightly toward said top wall, and the tooth having a socket substantially conforming to the shape of said shank for effecting a wedging engagement with the base.

References Cited in the file of this patent

UNITED STATES PATENTS

| | | |
|---|---|---|
| 1,519,101 | Armstrong | Dec. 16, 1924 |
| 2,040,085 | Fykse et al. | May 12, 1936 |
| 2,305,425 | Hollmann | Dec. 15, 1942 |
| 2,385,395 | Baer | Sept. 25, 1945 |
| 2,397,521 | Askue | Apr. 2, 1946 |
| 2,483,032 | Baer | Sept. 27, 1949 |